Patented Nov. 1, 1927.

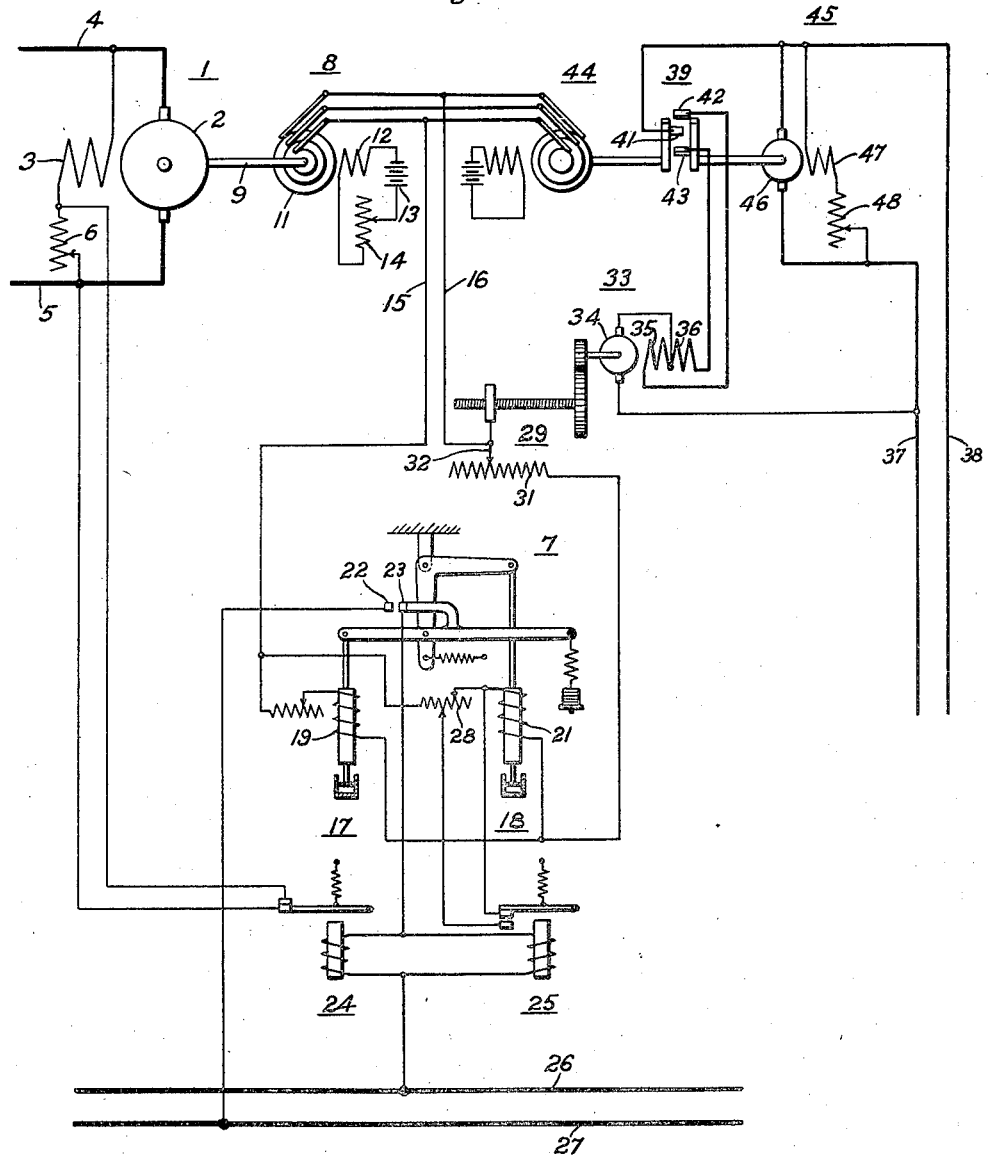

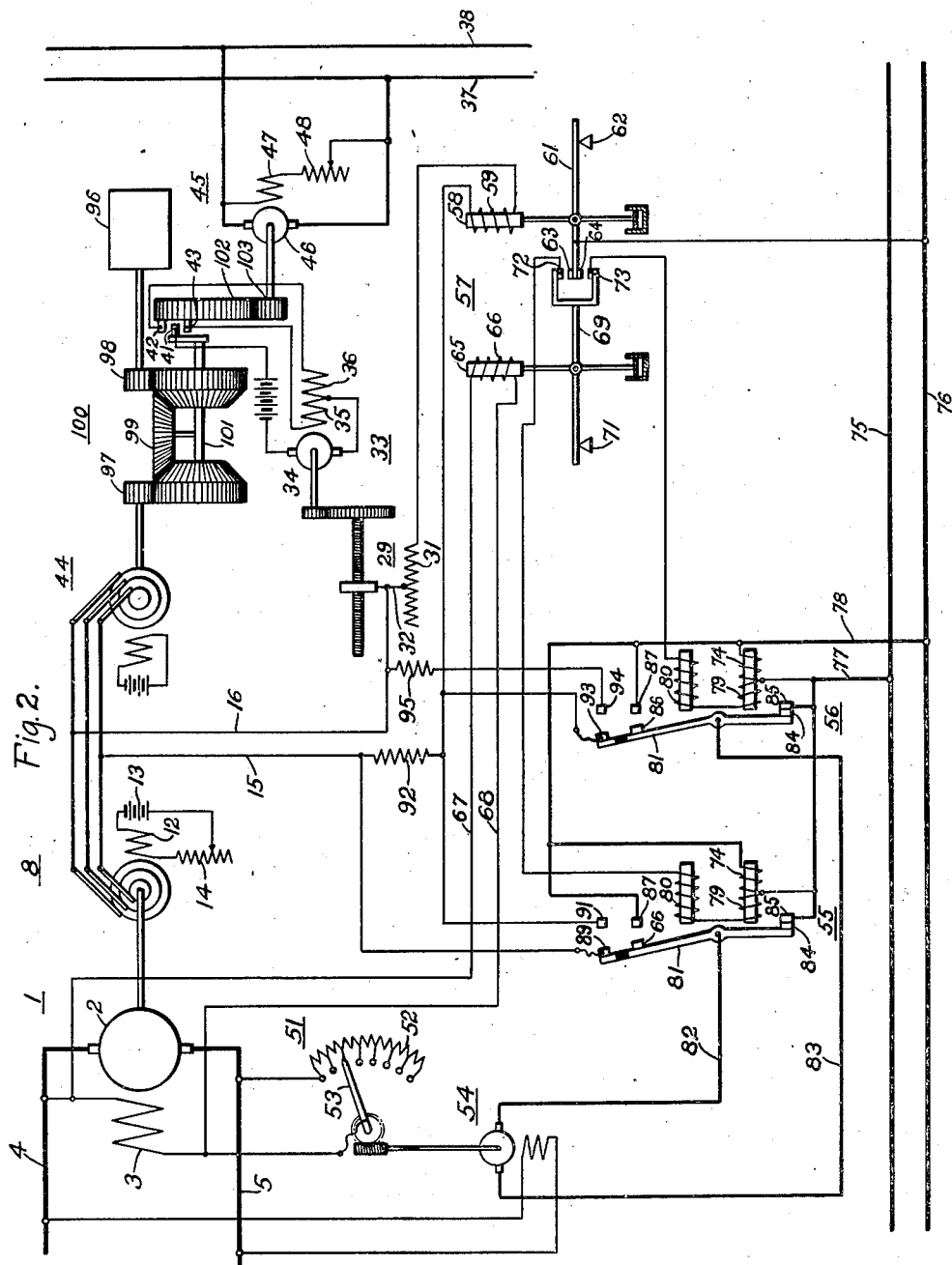

1,647,337

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA.

SPEED REGULATOR.

Application filed December 8, 1925. Serial No. 73,977.

Our invention relates to regulator systems and more particularly to regulator systems for governing the speed of electric motors.

One object of our invention is to so regulate the speed of a control motor that it will follow the speed of a reference means such as a clock device or other motor.

A further object of our invention is to provide a regulator of the above-indicated character in which the corrective tendency is cumulative, accurate, and quick acting.

Our invention contemplates the use of either a regulator of the vibrating type that intermittently short-circuits a resistor connected in series circuit relation with the field winding of the controlled motor, or a regulator of the rheostatic type wherein a motor-operated rheostat is used to control the motor field current. The regulator control element is energized from a pilot generator that is driven in accordance with the speed of the controlled motor. A motor-operated speed-adjusting rheostat is provided either in circuit with the field winding of the pilot generator or in circuit with the control magnet of the regulator, and is effective to change the setting of the regulator. The motor controlling the speed-adjusting rheostat is actuated by a differential mechanism that is responsive to the differential speed of the controlled motor and the speed-reference means.

Our invention will be better understood by reference to the accompanying drawing, wherein Figure 1 illustrates a diagrammatic view of apparatus embodied in a preferred form of the invention using a vibratory type regulator, and Fig. 2 illustrates a diagrammatic view of apparatus embodied in a preferred form of our invention using a rheostatic type regulator.

Referring to Fig. 1 of the drawing, a controlled motor 1, which is provided with an armature winding 2 and a field winding 3, is connected to conductors 4 and 5 of a source of direct-current power. A resistor 6 is provided in series-circuit relation with the field winding 3, the effective value of the resistor being controlled by a regulator 7 that is energized from a three-phase pilot generator 8, which is connected by means of a shaft 9 to the motor 1. The alternating-current pilot generator 8 is provided with an armature winding 11 and a field winding 12, which is energized from any suitable source, such as a battery 13, and is connected in circuit with an adjusting rheostat 14. The regulator 7 is connected by means of conductors 15 and 16 to the pilot generator armature 11, so that the regulator magnets are energized in accordance with the voltage thereof. The regulator 7 is provided with a control magnet 17 and an anti-hunting magnet 18 having windings 19 and 21, respectively, that are connected in parallel circuit relation to each other across the conductors 15 and 16. The regulator magnets 17 and 18 control the engagement and disengagement of contact members 22 and 23, which govern the action of relays 24 and 25 by connecting their parallel-related operating windings to a suitable source of energy, such as supply conductors 26 and 27. The relay 24 controls the effective value of the resistor 6 in circuit with the field winding 3 of the motor 1 (by intermittently short-circuiting a selected portion thereof), and the relay 25 short-circuits a portion of a resistor 28 that is connected in circuit with the coil 21 of the anti-hunting magnet 18.

In circuit with the coils of the magnets 17 and 18 of the regulator 7, an adjusting rheostat 29 is provided, having a resistor element 31 and a contact making arm 32 that is actuated by a pilot motor 33. The motor 33 is provided with an armature winding 34 and a pair of differentially related field windings 35 and 36, which are adapted to be connected to the source of supply 37 and 38 in accordance with the operation of a differential device 39. One side of the differential device 39 is provided with a contact member 41, and the other side is provided with a pair of contact members 42 and 43 that are respectively connected to the field windings 35 and 36 of the pilot motor 33, to thereby connect one of these field windings in series-circuit relation with the motor armature across the source of supply 37, 38, as the contact member 41 engages the one or the other of the contact members 42 or 43.

The contact member 41 is rotated by a three-phase synchronous motor 44 that is connected to the pilot generator 8 and is, therefore, caused to revolve at the same speed as the controlled motor 1. The contact members 42 and 43 of the differential device 39 are revolved by means of a speed-reference device, such as a motor 45, which is provided with an armature winding 46 and a field winding 47, and with a speed-controlling rheostat 48. The motor 45 is connected to a suitable source of supply, such as the conductors 37 and 38.

In the form of the invention illustrated in Fig. 2, a rheostat 51 is provided in place of the resistor 6 of Fig. 1, and comprises a resistor element 52 and a contact-making arm 53 that is actuated in accordance with the operation of a rheostat motor 54. The motor 54 is controlled by the operation of reversing switches 55 and 56, which are, in turn, governed by a regulator 57 that is energized in accordance with the voltage of the pilot generator 8. The regulator 57 is provided with a control magnet 58 having an operating coil 59, which is connected in circuit with the speed-adjusting rheostat 29, and, by means of conductors 15 and 16 is connected to the pilot generator 8. The magnet 58 controls a lever 61 that is mounted upon a pivot or fulcrum 62 and actuates contact members 63 and 64. The regulator 57 also comprises an anti-hunting magnet 65 having an operating winding 66, which is connected by means of conductors 67 and 68 to the field winding 3 of the controlled motor 1. The anti-hunting magnet 65 actuates a bifurcated lever 69 that is mounted upon a pivot 71 and carries contact members 72 and 73, which respectively cooperate with the contact members 63 and 64 to actuate the reversing switches 55 and 56.

The reversing switches 55 and 56 are each provided with a holding coil 74 that is permanently connected to supply conductors 75 and 76 by means of conductors 77 and 78. The reversing switches are also each provided with a neutralizing coil 79 and an operating coil 80 that are connected, in series-circuit relation with each other, to the contact members 72 and 73 of the regulator 57. The reversing switches are further provided with contact carrying arms 81 that are normally retained in their "open" of "dynamic braking" positions by the holding coils 74 and are operated to their "closed" position upon the energization of the neutralizing coil 79 and the operating coil 80. The contact-making arms 81 are connected by means of conductors 82 and 83 to the armature of the rheostat motor 54.

Each reversing switch 55 and 56 is also provided with a lower contact member 84 which is carried by the arm 81 and is adapted to engage contact member 85. This contact member is connected by means of a conductor 77 to the supply conductor 75; and through arm 81 is connected to an upper contact member 86 that is adapted to engage a contact member 87, which is connected by means of conductor 78 to the other supply conductor 76. The contact arm 81 of reversing switch 55 also carries an insulated contact member 89 that is adapted to engage contact member 91, which is so connected as to short-circuit a resistor 92 when the reversing switch contact arm is operated to its "closed" position. The resistor 92 is in series circuit relation with the coil 59 of the regulator control magnet 58 and, when short-circuited causes an increase in the energization of the coil 59 to thus prevent hunting action of the regulator.

The contact arm of the reversing switch 56 carries a similar insulated contact member 93 that is adapted to engage contact member 94 and close a circuit through a resistor 95, which is thereby connected in parallel circuit relation to the coil 59, so as to decrease the energization of the winding 59 of the regulator control magnet upon the operation of the reversing switch 56 to its "closed" position.

In the system of Fig. 1, the speed-adjusting rheostat 29 is actuated in accordance with the operation of the pilot motor 33 in response to the engagement of the contact members 41, 42 and 43. In Fig. 2, we have illustrated the use of a mechanical differential 100, one side of which is controlled by the synchronous motor 44 by means of a gear-wheel 97. The other side of the differential is controlled by a clock mechanism 96 through a gear-wheel 98. The middle element 99 of the differential device actuates a shaft 101 upon which the contact member 41 is mounted. The contact members 42 and 43 are connected through a suitable gear-wheel mechanism 102 and 103 to be driven by the motor 45.

The regulator 7, illustrated in Fig. 1, operates as a vibratory voltage regulator tending to maintain the voltage upon the pilot generator 8 constant, and controls the speed of the motor 1 to produce constant voltage of the pilot generator. Should the setting of the rheostats 14 and 29 be such that the voltage of the pilot generator 8 energizing the regulator 7 corresponds to the speed at which the speed-reference motor 45 is being driven, the contact member 41 will remain in its central position with respect to the contact members 42 and 43, and the pilot motor 33 will remain at rest.

Should, however, the voltage impressed upon the regulator 7 from the pilot generator 8 correspond to a speed of the controlled motor 1 that is different from the speed of the reference motor 45, the contact member 41 will engage one of the contact members 42 and 43, thus causing the pilot motor 33 to rotate in the one or the other direction, thereby actuating the rheostat 29 so as to change the setting of the regulator by varying the voltage applied to the magnets of the regulator 7, and consequently the effective value of the resistor 6 in the field winding circuit of the motor 1, thereby bringing the motor 1 into synchronism with the motor 45.

In the form of the invention illustrated in Fig. 2, the setting of the regulator 57 is effected by a change in the adjustment of the rheostat 29 in exactly the same way that the setting of the regulator 7 of Fig. 1 is changed. In some cases it is desirable to use both a clock mechanism, such as 96, and a motor, such as 45, as the speed-reference means, inasmuch as a more accurate control is possible. It is obvious that the controlled motor 1 may be regulated to operate at a constant speed by operating the speed-reference motor 45 and the clock mechanism 96 at a constant speed, and that the speed of the controlled motor 1 may be varied to correspond to a varying speed of the reference motor 45. It is also obvious that a similar result may be obtained by controlling the setting of the regulator by means of the rheostat 14, which governs the generated voltage of the generator 8, instead of adjusting the rheostat 29 that is in series relation with the regulator control magnet 59.

Many modifications in the apparatus and arrangement of parts may be made without departing from the spirit of this invention and we do not wish to be limited other than by the scope of the appended claims.

We claim as our invention:—

1. In combination, a speed-reference means, a dynamo-electric machine having a field winding, means for regulating the excitation of said field winding comprising a plurality of contact members, means for actuating one of said contact members in accordance with the speed of said machine, and means for varying the operation of said contact members in accordance with the differential speed of said speed-reference means and said dynamo-electric machine.

2. In combination, a speed-reference means, a dynamo-electric machine having a field winding, a regulator for governing the excitation of said field winding, means for energizing said regulator in accordance with the speed of said machine, and means for changing the setting of said regulator in accordance with the differential speed of said speed-reference means and said dynamo-electric machines.

3. In combination, an electric motor having a field winding, a regulator for governing the excitation of said field winding, means for energizing said regulator in accordance with the speed of said motor, and means for changing the setting of said regulator in accordance with variations in the speed of said motor from the desired value.

4. In combination, an electric motor having a field winding, a regulator for governing the excitation of said field winding, a pilot generator for energizing said regulator in accordance with the speed of said motor, a rheostat for changing the setting of said regulator, and means for actuating said rheostat in accordance with variations in the speed of said motor.

5. In combination, a reference means, an electric motor having a field winding, a regulator for governing the excitation of said field winding, a pilot generator for energizing said regulator, means for actuating said pilot generator in accordance with the speed of said motor, a rheostat for changing the setting of said regulator, and means for actuating said rheostat in accordance with the differential speeds of said reference means and said motor.

6. In combination, a reference means, an electric motor having a field winding, a rheostat in circuit with said field winding, a regulator for governing said rheostat in accordance with speed variations of said motor, a rheostat in circuit with said regulator, and means for actuating said last named rheostat in accordance with the differential speeds of said reference means and said motor.

7. In combination, a reference means, an electric motor having a field winding, a resistor in circuit with said field winding, a regulator for intermittently short circuiting a selected portion of said resistor for varying durations of time in accordance with speed variations of said motor, a rheostat in circuit with said regulator, and means for actuating said rheostat in accordance with the differential speeds of said reference means and said motor.

In testimony whereof, we have hereunto subscribed our names this 7th day of December, 1925.

WILLIAM M. BRADSHAW.
JOHN H. ASHBAUGH.